United States Patent [19]
Aruga et al.

[11] Patent Number: 5,317,976
[45] Date of Patent: Jun. 7, 1994

[54] VEHICLE AND HIGH-SPEED TRANSPORT SYSTEM HAVING ROTATING ALTERNATING POLARITY MAGNET MEMBER FOR LEVITATING, PROPELLING, AND GUIDING THE VEHICLE

[75] Inventors: Hideki Aruga, Chiba; Minoru Toyoda, Aichi; Yoshihiro Kyotani, Chiba; Shuzo Moroto; Masao Kawai, both of Aichi; Toshihiro Shiimado, Chiba; Yoshihisa Ito; Koji Hori, both of Tokyo, all of Japan

[73] Assignee: Kabushikikaisha Equos Research, Japan

[21] Appl. No.: 820,420

[22] Filed: Jan. 14, 1992

[30] Foreign Application Priority Data

Nov. 22, 1991 [JP] Japan .................. 3-307912
Nov. 22, 1991 [JP] Japan .................. 3-332909

[51] Int. Cl.⁵ .............................. B60L 13/04
[52] U.S. Cl. ...................... 104/282; 104/284; 104/285; 104/290; 191/10
[58] Field of Search ............ 104/281, 282, 284, 285, 104/290; 105/53, 54, 96; 191/10

[56] References Cited

U.S. PATENT DOCUMENTS

| | | | |
|---|---|---|---|
| 3,903,808 | 9/1975 | Foldes | 104/281 X |
| 3,904,899 | 9/1975 | Malfert | 104/290 |
| 4,092,554 | 5/1978 | Quinn | 191/10 X |
| 4,160,181 | 7/1979 | Lichtenberg | 104/289 |

FOREIGN PATENT DOCUMENTS 3841011  6/1990  Fed. Rep. of Germany ...... 104/290

Primary Examiner—Robert J. Oberleitner
Assistant Examiner—S. Joseph Morano
Attorney, Agent, or Firm—Lorusso & Loud

[57] ABSTRACT

A vehicle has a rotary magnetic field member which is rotatably supported at a position near the surface of a roadway along which the vehicle runs and rotatingly driven by a driving device. The rotary magnetic field member has magnetic poles of different polarities alternately arranged around its circumference. The vehicle also has an electrical power collector for receiving electrical power from an electrical power supply associated with the roadway. The received electrical power is supplied under the control of a controller to the driving device thereby rotatably driving the rotary magnetic field member. The rotary magnetic field member when rotated relative to the roadway made of an electrically conductive non-magnetic material, forms a varying magnetic field in cooperation with the roadway, thereby generating propulsion force for propelling the vehicle and force for suspending the vehicle, so that the vehicle is propelled in a floating state. It is therefore possible to reduce friction between wheels of the vehicle and the roadway and, hence, to suppress wear of the wheels. In a high-speed transportation system of the invention, the electrical power collector picks up electrical power from the electrical power supply and the rotary magnetic field member is rotatingly driven by the power picked up by the electrical power collector.

17 Claims, 11 Drawing Sheets

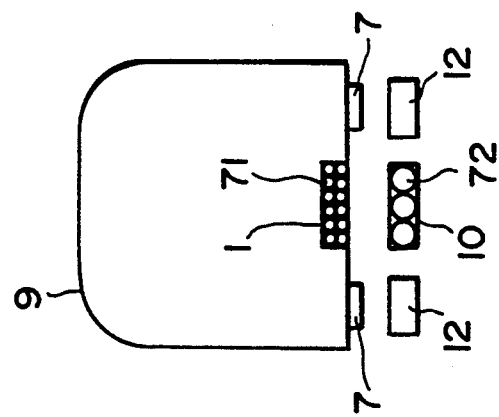
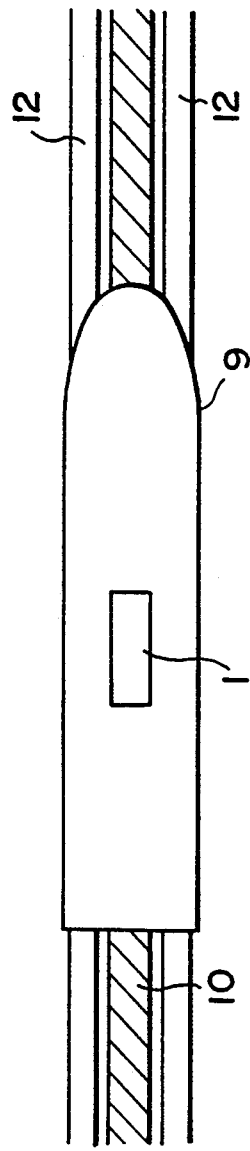
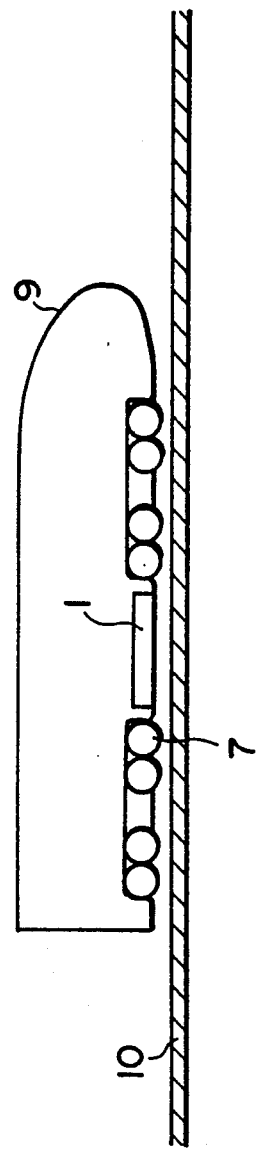

VEHICLE AND HIGH-SPEED TRANSPORT SYSTEM HAVING ROTATING ALTERNATING POLARITY MAGNET MEMBER FOR LEVITATING, PROPELLING, AND GUIDING THE VEHICLE

BACKGROUND OF THE INVENTION

The present invention relates to a vehicle which runs along a way such as a track, road surface or the like, and also to a high-speed transport system which uses such a vehicle.

In general, a conventional vehicle which runs on a road surface has an internal combustion engine which produces torque, e.g., a gasoline engine. The output torque of the engine is transmitted to a driving wheel or wheels through an automatic or manual transmission. The output torque of the engine is derived from energy generated by combustion of a compressed air-fuel mixture. The combustion of the fuel-air mixture not only generates noise but also produces exhaust gases which the environment.

In order to alleviate this problem, an electrically-propelled vehicle has been produced in which an electric motor is substituted for the gasoline engine to produce torque without generation of noise and exhaust gases. More specifically, this type of vehicle carries an electric motor together with a power supply such as a series of batteries, the motor generating driving torque which is transmitted to driving wheels to propel the vehicle. The level of noise, therefore, is very low and no exhaust gas is generated at all.

This type of vehicle, however, still suffers from the disadvantage that, since the propelling force is generated through friction between the road surface and the tires of the driving wheels, the tires wear down, particularly when heavy loads are applied. In addition, tire wear is accelerated when the vehicle runs at higher speeds. This creates a practical limit to the running speed of the vehicle.

Another problem is that the performance of the vehicle is limited by the electrical power supply. For instance, the vehicle can run only a short distance when batteries are used as the power supply.

Accordingly, an object of the present invention is to provide a vehicle which can run a long distance at high speed without substantial tire wear, as well as a high-speed transport system which uses such a vehicle.

Linear motor cars have been proposed in recent years, as vehicles which can operate along a track without contacting it. The linear motor car, as well as a high-speed transport system using such a linear motor car, employs floating coils laid on the track for floating the vehicle and propulsion coils laid along both sides of the track in such a manner as to sandwich the vehicle therebetween so as to propel it. Thus, known linear motor cars essentially require two kinds of coils, one for floating and one for propulsion, as well as a complicated system for energizing successive propulsion coils in the direction of motion of the vehicle. Moreover, it is necessary to lay a large number of floating and propulsion coils along the track. Consequently, an impractically large cost is required for building up such a track.

Another object of the present invention is to provide a vehicle and a high-speed transport system which are improved to reduce the cost for laying the track.

SUMMARY OF THE INVENTION

To these ends, according to one aspect of the present invention, there is provided a vehicle having a rotary magnetic field member rotatably carried by the vehicle at a position near the surface of the way along which the vehicle runs, and driving means for rotatably driving the rotary magnetic field member. The rotary magnetic field member has poles of different polarities arranged alternately in the circumferential direction.

The vehicle also has power collecting means through which external electrical power is supplied to the vehicle. The electrical power received through the power collecting means is supplied to the above-mentioned driving means so that the rotary magnetic field means is driven. The rotary magnetic field member, when rotatably driven in the vicinity of the surface of a way made from an electrically conductive and non-magnetic material, produces a varying magnetic field with respect to the way. As a consequence, propulsion and floating forces are generated to act on the rotary magnetic field member, whereby the vehicle advances while being floated.

According to another aspect of the present invention, there is provided a high speed transport system which comprises a way made of an electrically conductive non-magnetic material, electrical power supplying means along the way, and a vehicle having the above-described features and adapted to run along the way. The power collecting means carried by the vehicle is supplied with electrical power from the electrical power supplying means.

The rotary magnetic field member may be made up from superconducting coils. In such a case, the vehicle may carry a refrigerator for cooling the superconducting coils so as to maintain these coils in superconductive state.

BRIEF DESCRIPTION OF DRAWINGS

These and other objects, features and advantages of the present invention will become more clear from the following description when the same is read in conjunction with the accompanying drawings.

FIG. 9 is a plan view of a non-contact type current collector used in a high-speed transport system embodying the present invention;

FIG. 10 is a side elevational view of the non-contact type current collector used in a high-speed transport system embodying the present invention;

FIG. 11 is a front elevational view of the non-contact type current collector of FIG. 10 used in a high-speed transport system embodying the present invention;

DESCRIPTION OF PREFERRED EMBODIMENTS

Figure 1:
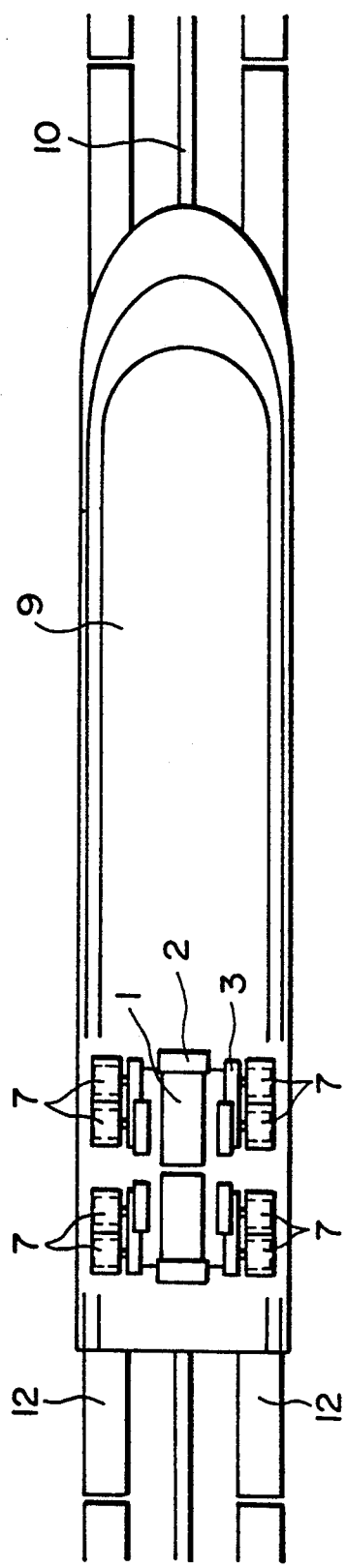
FIG. 1 is a plan view of a vehicle embodying the present invention.

A first embodiment of the vehicle in accordance with the present invention will be described with reference to FIG. 1 and FIG. 2 which are a plan view and a side elevational view of the vehicle, respectively, as well as to FIG. 3 which is a block diagram of a high-speed transport system of the invention.

The vehicle has a driving system which includes a current collector 1, a controller 2, a cooling system 3 and a driving mechanism 7. In the illustrated embodiment, the current collector 1 is installed on the bottom of the vehicle chassis 9 so as to receive electrical power from an electrical power supply device 10 in or out of contact therewith. The cooling system 3, in cooperation with a cryostat 15 forms a refrigerator which cools superconducting magnets 11 of the driving mechanism 7 to a cryogenic temperature to maintain them in a superconductive state. More specifically, the cooling system 3 has a plurality of refrigeration cycles connected to form a plurality of stages which are under the control of the controller 2. The electrical power supply device 10 is constituted by a power supply bar which is laid on a track in parallel with rows of reaction plates 12.

As will be described later in more detail, the driving mechanism 7 rotatably drives the superconducting magnet 11 which is cooled down to the cryogenic temperature by the cryostat 15, so that forces for floating, propelling and guiding the vehicle chassis 9 are generated by the interaction between the superconducting magnet 11 and the reaction plate 12. As will be seen from FIG. 1, a plurality of pairs of driving mechanism 7 are installed on both sides of the vehicle chassis 9, and the rows of reaction plates 12 are laid on the track. The reaction plates 12 may be formed from an electrically conductive non-magnetic material such as aluminum, copper or the like. It is also possible to use an electrically conductive resin such as polyacetylene as the material of the reaction plate 12.

The current collector 1 receives electrical power from the electrical power supply device 10 and delivers the same to the cooling system 3 and also to a stator coil 16 through a controller 2. The superconducting magnet 11 carries magnetic poles of opposite polarities which are arranged alternately and are adapted to be rotatably driven by the stator coil 16. More specifically, the stator coil 16 is fixed in the cylindrical rotatable superconducting magnet 11. The superconducting magnet 11 is rotated as 3-phase A.C. power is supplied to the stator coil 16. The controller 2 can control the rotation speed and the rotation direction of the superconducting magnet 11 of each driving mechanism 7 independently.

Figure 4:
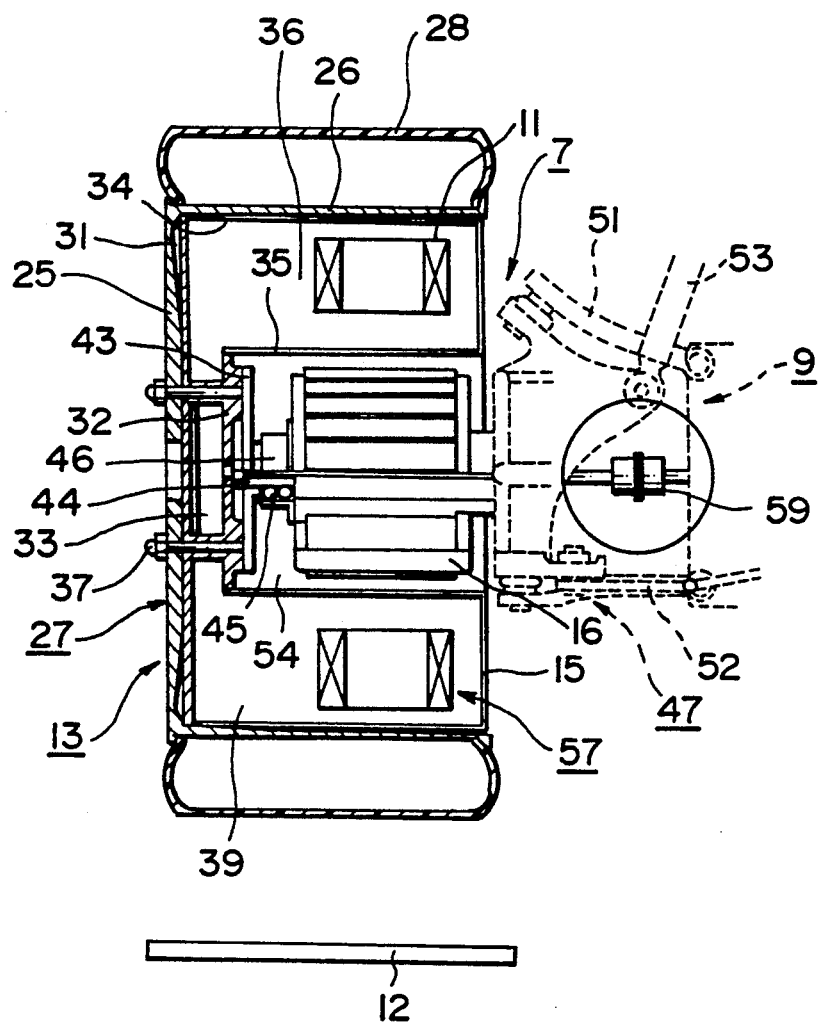
FIG. 4 is a sectional view of a first example of a driving mechanism incorporated in the vehicle embodying the present invention.

FIG. 4 is a sectional view of an example of the driving mechanism used in a vehicle embodying the present invention. Referring to this Figure, a driving wheel 13 has a disk wheel 27 which is composed of bottom portion 25 and a cylindrical portion 26.

A wheel, i.e., a rubber tire 28, surrounds and fits on the cylindrical portion 26 of the disk wheel 27. When the vehicle chassis 9 is floated magnetically, the rubber tire 28 is spaced apart from the reaction plate 12 without contacting the latter, as shown in this Figure. When the vehicle chassis 9 is not floated magnetically, the rubber tire 28 contacts the reaction plate 12 so as to support the vehicle chassis 9.

The disk wheel 27 has cup-shaped cryostat 15 disposed in a space defined by the bottom portion 25 and the cylindrical portion 26. The cryostat 15 has a bottom portion 33 which includes a circular outer bottom wall 31 which is disposed along the bottom portion 25 of the disk wheel 27, and an inner bottom wall 32 which is disposed in parallel with and inside the outer bottom wall 31. The cryostat 15 has also a cylindrical portion 36 which includes an outer cylindrical wall 34 which is disposed along the cylindrical portion 26 of the disk wheel 27, and an inner cylindrical wall 35 which is disposed inside the outer cylindrical wall 34 and radially spaced therefrom.

The above-mentioned disk wheel 27 and the cryostat 15 are fastened together by means of bolts 37 which are disposed along a circle around the center of the disk wheel 27.

A rotary magnetic field member, i.e., a superconducting magnet 11 which is composed of superconducting coils, is disposed inside the cylindrical portion 36 of the cryostat 15. The superconducting magnet 11 is cooled down to a cryogenic temperature by liquid helium so as to be kept in a superconducting state. The superconducting magnet 11 is therefore connected to a permanent current switch which is not shown, so as to form a closed loop circuit in the superconducting state.

The tire 28, disk wheel 27 and the cryostat 15 are formed integrally, and this integral structure is fixed to a support 43 by means of the bolts 37 mentioned above. The support 43 has a hub 44 which projects towards the vehicle chassis 9. The hub 44 is rotatably supported on a shaft 46 through a bearing 45. The shaft 46 is fixed to a suspension device 47 and is connected to the vehicle chassis 9 through the suspension device 47.

The above-mentioned suspension device 47 has a link mechanism of double-wishbone type which is composed of an upper arm 51 and a lower arm 52. This suspension device 47 is supported by the vehicle chassis 9 in such a manner as to absorb or damp mechanical impact by a cooperation between a coiled spring (not shown) and a damper 53. Obviously, any other suitable suspension device than that described above may be used for the purpose of supporting the shaft 46 on the vehicle chassis 9.

A cylindrical recess 54 is formed inside the inner bottom wall 32 and the inner cylindrical wall 35 of the cryostat 15. A cylindrical stator coil 16 fixed to the shaft 46 is supported in the recess 54. The stator coil 16 and the superconducting magnet 11 in cooperation form a synchronous superconducting motor 57.

The cryostat 15 is cooled by liquid helium which is held at the cryogenic temperature by means of the cooling system 3. To this end, a cold-heat supply device 59 is disposed in the vicinity of the cryostat 15. The liquid helium supply device 59 may be directly supplied with liquid helium from the cooling system 3 or may be supplied with liquid helium indirectly by heat transfer. In the illustrated embodiment, the liquid helium supply device 59 is disposed in the vicinity of the suspension device 47. However, it may be disposed inside the shaft 46.

A description will now be given of the operation of the superconducting motor 57 by making reference also to FIG. 5.

Figure 5:
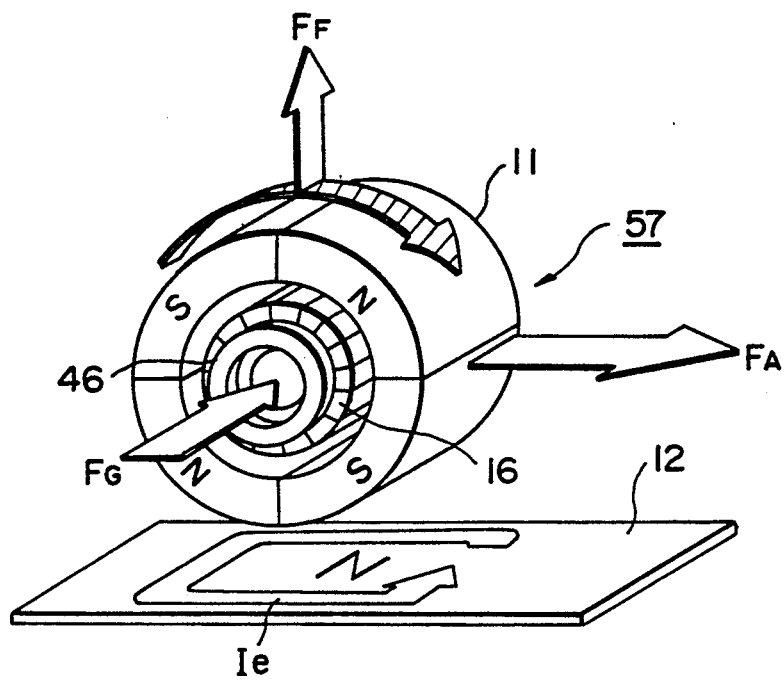
FIG. 5 is an illustration of the principle of operation of a driving mechanism in the vehicle embodying the present invention.

FIG. 5 illustrates the concept of the driving mechanism 7 in a vehicle embodying the present invention. As will be seen from this Figure, the superconducting magnet 11 is rotatably disposed in the vicinity of the reaction plate 12. The stator coil 16, which is fixedly supported by the shaft 46, is disposed inside the superconducting magnet 11. The superconducting magnet 11 is so constructed that, when permanent current is supplied thereto, pairs of N and S poles are developed to alternately appear in the circumferential direction. In the illustrated case, four magnetic poles, i.e., two N poles and two S poles, are formed on the superconducting magnet 11.

When the driving current supplied through the current collector 1 is delivered to the stator coil 16 under the control of the controller 2, varying magnetic fields, e.g., alternating magnetic fields, are generated in accordance with the driving current, so that the superconducting magnet 11 is rotated about the axis of the shaft 46 to rotatingly drive the drive wheel 13. Thus, in the case where the reaction plates 12 are not laid along the track, the vehicle is propelled by the friction between the tire 28 and the track surface as in the case of ordinary railroad vehicles, by the torque produced by rotation of the superconducting magnet 11 which cooperates with the stator coil 16 in the superconducting motor 57.

Figure 2:
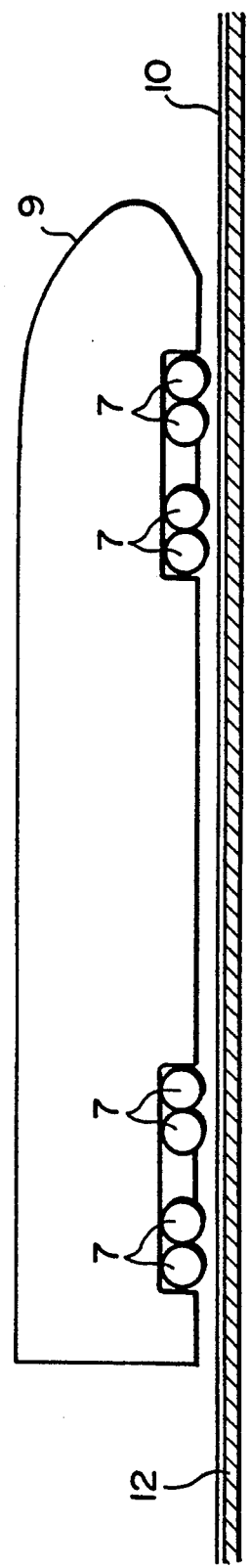
FIG. 2 is a side elevational view of the FIG. 1 embodying the present invention.
Figure 3:
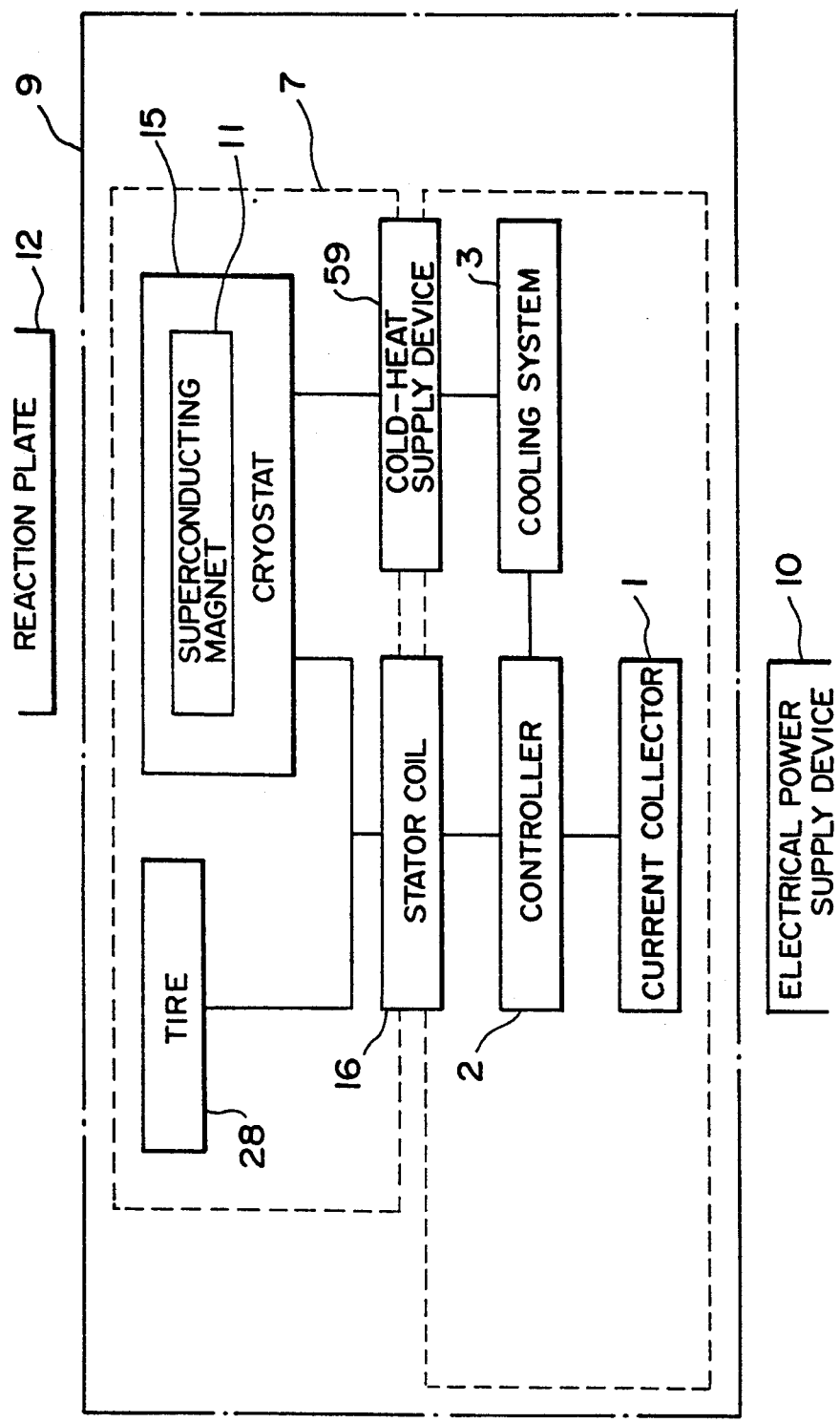
FIG. 3 is a block diagram of a high-speed transport system embodying the present invention.

In the case where the reaction plates 12 are laid along the track as shown in FIG. 1 and 2, the force for propelling the vehicle is produced through the friction between the tire 28 and the reaction plates 12. The vehicle, however, can also be propelled by a propulsion force which is generated by a magnetic interaction produced on the reaction plate 12 as a result of the rotation of the superconducting magnet 11.

When the vehicle is propelled by magnetic interaction, the vehicle runs in a magnetically floated state while being guided by the reaction plates 12 without contacting the track surface. In this case, therefore, no mechanical friction is generated between the tire 28 and the reaction plate 12. Namely, in this case, the magnetic interaction between the superconducting magnet 11 and the reaction plate 12 produces a forward propelling force $F_A$ which propels the vehicle forwardly, a floating force $F_F$ which magnetically lifts and floats the vehicle upward and guiding force $F_G$ which acts to guide the vehicle along the rows of the reaction plates 12. To this end, the superconducting magnet 11 is disposed such that the distance between the superconducting magnet 11 and the reaction plate 12 is small enough to obtain sufficiently high levels of the forward propulsion force $F_A$, the floating force $F_F$ and the guiding force $F_G$.

More specifically, rotation of the superconducting magnet 11 causes a change in the amount of magnetic flux which is generated by the superconducting magnet 11 and which interlinks with the reaction plate 12. The change in the amount of magnetic flux induces an induction current $I_e$ in the reaction plate 12. The induction current $I_e$ produces a magnetic interaction which generates the forward propulsion force $F_A$, the floating force $F_F$ and the guiding force $F_G$ which act between the superconducting magnet 11 and the reaction plate 12.

It is possible to obtain a large forward propulsion force $F_A$ by using, as the material of the coil of the superconducting magnet 11, an oxide-type superconducting material which has been developed recently and which can conduct very large electrical currents even under the influence of strong magnetic fields.

Thus, in the described embodiment, the vehicle is propelled by the propulsion force $F_A$ which is generated as a result of the magnetic interaction taking place between the superconducting magnet 11 and the reaction plate 12. The vehicle, therefore, can run by the propulsion force $F_A$ even when the mechanical friction between the reaction plate 12 and the tire 28 is reduced due to zero, for example, icing of the surface of the reaction plate 12.

In the embodiment shown in FIG. 4, the cryostat 15 is disposed on the inner peripheral side of the tire 28. This, however, is not essential and the cryostat 15 may be separated from the tire 28.

Figure 6:
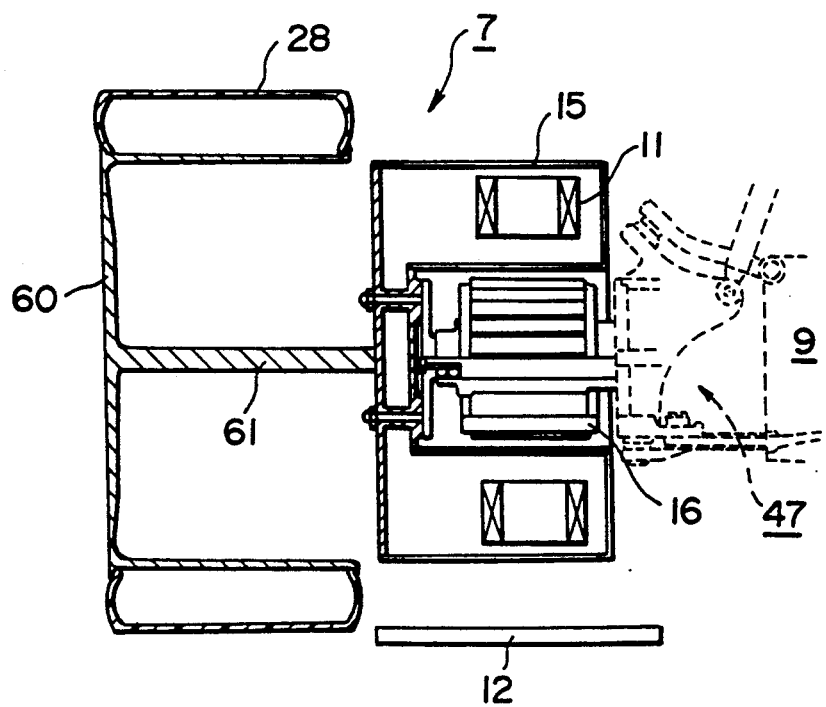
FIG. 6 is an illustration of a second example of the driving mechanism incorporated in the vehicle embodying the present invention.

FIG. 6 shows a second example of the driving mechanism employed in the vehicle embodying the present invention.

In this driving mechanism, an assembly including the cryostat 15, the superconducting magnet 11 and the stator coil 16 are disposed between the tire 28 and the vehicle chassis 9 and are connected between a disk wheel 60 and the suspension device 47. The disk wheel 60 to which the tire 28 is attached has a shaft 61 which projects toward the vehicle chassis 9 from the center thereof towards the cryostat 15 and is connected to the latter. According to this arrangement, it is possible to position the superconducting magnet 11 closer to the reaction plate 12 because the tire 28 is located outside the region where the superconducting magnet 11 and the reaction plate 12 face each other. It is therefore possible to increase the amount of the magnetic flux coupling with the reaction plate 12.

The tire 28 may be an iron or steel wheel which is used on ordinary rail road vehicles. In such a case, the arrangement may be such that the speed of rotation of the superconducting magnet 11 or the thickness of the reaction plate 12 is suitably determined so as to control the floating force $F_F$ in such as manner that the vehicle is not completely floated, i.e., such that reduced load is applied to the tire 28 which is still in mechanical contact with the track or rail. With such an arrangement, it is possible to reduce the levels of noise and vibration during running of the vehicle and also to increase the maximum ascent gradient or angle of the vehicle, while improving controllability of the vehicle.

Figure 7:
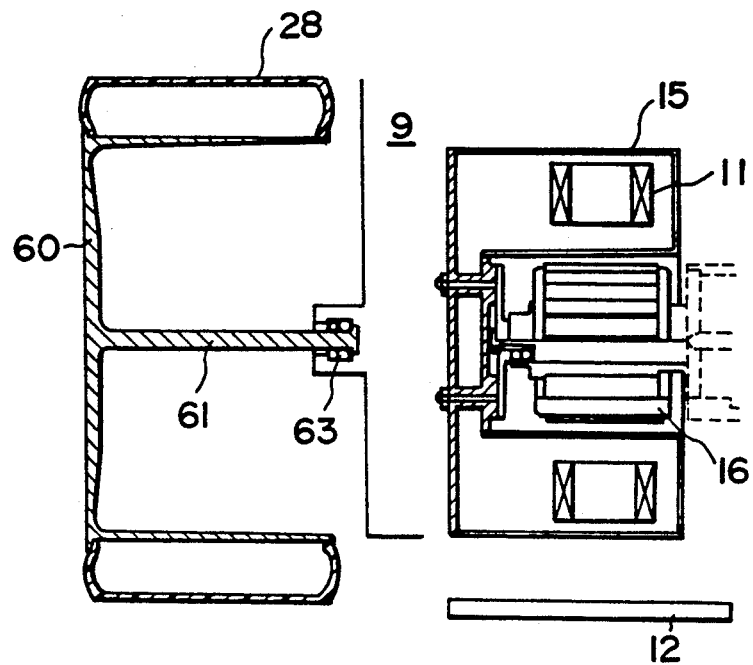
FIG. 7 is an illustration of a third example of the driving mechanism incorporated in the vehicle embodying the present invention.

FIG. 7 shows a third example of the driving mechanism used in the vehicle embodying the present invention.

Referring to this Figure, an assembly including the cryostat 15, the superconducting magnet 11 and the stator coil 16 are disposed inside the vehicle chassis 9. The disk wheel 60 is provided with a shaft 61 which extends toward the vehicle chassis 9 from the center thereof and which is rotatably supported by the vehicle chassis 9 through a bearing 63. With this arrangement, it is possible to position the superconducting magnet 11 closer to the reaction plate 12 because the tire 28 is located outside the region where the superconducting magnet 11 and the reaction plate 12 face each other, as in the case of the example shown in FIG. 6.

It is therefore possible to increase the amount of the magnetic flux coupling interlink with the reaction plate 12.

In this example, the tire 28 may be an iron or steel wheel of the same type as that used on ordinary railroad vehicles. The iron or steel wheel as the tire 28 may be power-driven by a motor through a power transmission system both of which are not shown. The above-mentioned motor, which drives the tire 28, need not be of the type which operates in a superconducting state. Namely, the motor may be of the type which operates at normal temperature.

Figure 8:
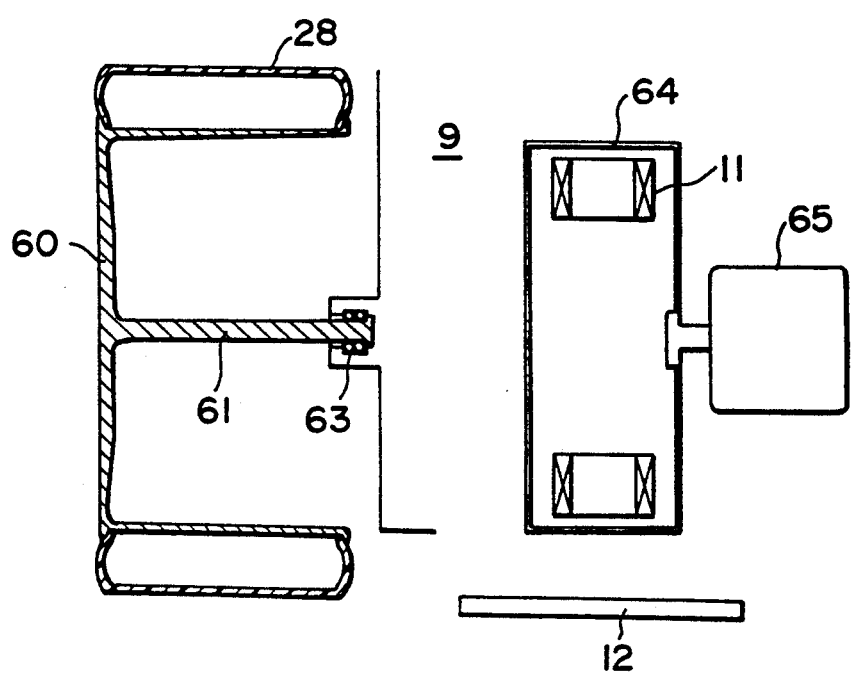
FIG. 8 is an illustration of a fourth example of the driving mechanism incorporated in the vehicle embodying the present invention.

FIG. 8 is an illustration of a fourth example of the driving mechanism used in the vehicle embodying the present invention.

Referring to this Figure, a cryostat 64 and a superconducting magnet 11 are disposed inside the vehicle chassis 9. The cryostat 64 is rotatably driven by a separate motor 65 which is installed on the vehicle chassis. In this example, it is not necessary to employ a stator coil such as 16 shown in FIG. 4. The superconducting magnet 11 is directly driven by the motor 65. According to this arrangement, it is possible to position the superconducting magnet 11 closer to the reaction plate 12 because the tire 28 is located outside the region where the superconducting magnet 11 and the reaction plate 12 face each other. It is therefore possible to increase the amount of the magnetic flux coupling with the reaction plate 12.

The disk wheel 60 has a shaft 61 which extends toward the vehicle chassis 9 from the center thereof and which is rotatably supported by the vehicle chassis 9 through the bearing 63. In this case, the tire 28 is intended for making rolling contact with the track and is power-driven through a power transmission by a motor both of which are not shown. The above-mentioned motor which drives the tire 28 need not be of the type which operates in superconducting state. Namely, the motor may be of the type which operates at normal temperature.

In each of the driving mechanisms 7 described above, the superconducting magnet 11 in the cryostat 15 or 64 is cooled by liquid helium. The cryostat 15 or 64 is rotatable relative to the vehicle chassis 9. The liquid helium, which is used for cooling the superconducting magnet 11, is evaporated into the gaseous phase as a result of absorption of heat from the superconducting magnet 11. It is therefore necessary to cool the helium gas to liquefy it into the liquid phase. This liquefaction is performed by the cooling system 3 installed in the vehicle chassis 9.

The cooling system 3 generally is large in size and, therefore, stationarily mounted on the vehicle chassis 9, while the cryostat 15 or 64 to be cooled is rotated on the vehicle chassis 9.

Supply of the liquid helium from the stationary cooling system 3 to the rotating cryostat 15 or 64 is effectively performed by the liquid helium supply device 59.

FIG. 9 is a plan view of a non-contact type current collector used in a high-speed transport system of the present invention. FIG. 10 and 11 are a side elevational view and a front elevational view of the current collector shown in FIG. 9, respectively.

As will be seen from these Figures, the current collector 1 has an onboard coil 71 which is provided on the bottom of the vehicle chassis 9, whereas the electrical power supply device 10 includes a power feeding line, e.g., a track coil 72, laid along the track. The track coil 72 is adapted to be supplied with high-frequency electrical current. As a result of supply of high-frequency current to the track coil 72, high-frequency current is generated in the onboard coil 71 on the vehicle due to electromagnetic induction. The electrical power produced by this current is distributed to the cooling system 3 and the stator coil 16. The distribution of this electrical power is conducted under the control of the controller 2. Although an array of track coils 72 is used as the electrical power supply device 10, this is not limiting and the electrical power supply device 10 may be a linear conductor which is laid along the track and which is supplied with 3-phase A.C. power.

It is possible to connect a resonance capacitor in parallel with the onboard coil 71, so as to maximize the efficiency of collection of electrical power by the onboard coil 71. In general, the electrical power which can be picked up by the onboard coil 71 decreases when the distance between the onboard coil 71 and the track coil 72 increases. The resonance capacitor, however, makes it possible to maximize the electrical power picked up by the onboard coil 71 when the distance between the onboard coil 71 and the track coil 72 is set to a predetermined value. Practically, the current collector is designed so as to maximize the power collecting efficiency, by suitably selecting the values of parameters such as the number of turns of the onboard coil 71 and the track coil 72 and the frequency of the high-frequency current supplied to the track coil 72. High power collection efficiency well reaching 70 to 80% can be attained by suitable selection of values of these parameters.

The electrical power picked up by the onboard coil 71 on the vehicle drastically decreases when the onboard coil 71 is laterally offset from the track coil 72. An experimental computation showed that lateral offset of the onboard coil 71 by 10 cm causes a reduction of the electrical power collected by the onboard coil 71 almost to half level.

The driving mechanism 7 used in the high-speed transport system of the invention offers an advantage in that the guiding force $F_G$, which is generated as a result of the rotation of the superconducting magnet 11, effectively acts to prevent lateral offset of the onboard coil 71 from the right position.

Figure 12:
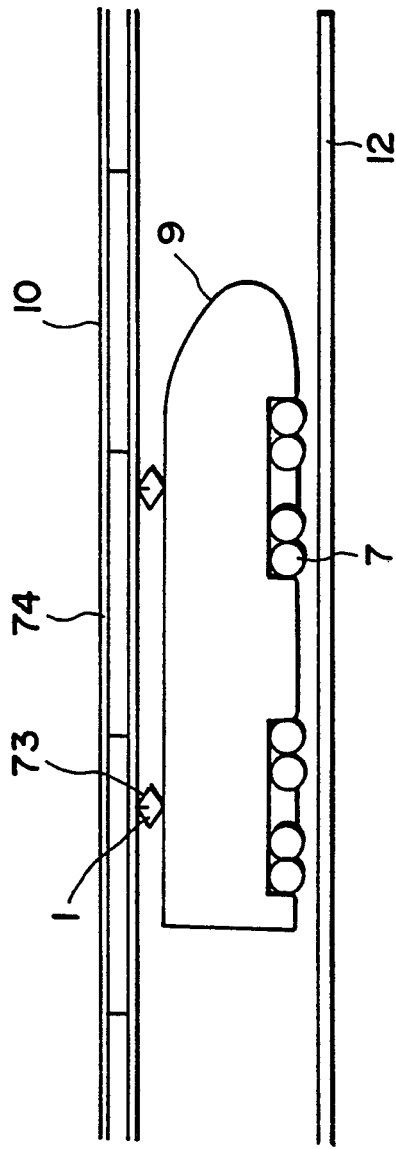
FIG. 12 is a plan view of a contact-type current collector used in a high-speed transport system embodying the present invention.

Although a non-contact type current collector has been described, the current collector used in the high-speed transport system of the present invention way be of contact type. FIG. 12 is a plan view of an example of such a contact-type current collector, while FIG. 13 is a front elevational view of the contact-type current collector shown in FIG. 13.

Figure 13:
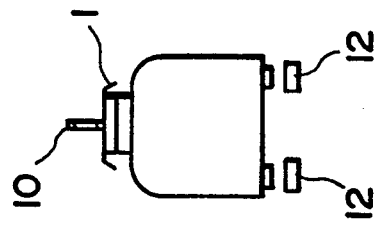
FIG. 13 is a front elevational view of the contact-type current collector of FIG. 12 used in a high-speed transport system embodying the present invention.

The current collector shown in FIGS. 12 and 13 are of a type which incorporates a pantograph 73 mounted on the top of the vehicle chassis 9. The pantograph 73 makes sliding contact with an overhead contact wire 74 serving as the electrical power supply device 10, so that electrical power is supplied to the vehicle from the overhead contact wire 74 through the pantograph 73.

When a contact-type electrical power collector such as a pantograph 73 is used, it is necessary that the pressure of contact between the pantograph 73 and the overhead contact wire 74 is maintained constant and that the friction and wear between the pantograph 73 and the overhead contact wire 74, is minimized. To this end, either one or both of the pantograph 73 and the overhead contact wire 74 are designed and constructed to have enough flexibility to respond to any change in the position of the contact surface. For instance, it is a common measure to use a light-weight pantograph and to use a catenary suspension type overhead contact wire.

It is also an effective measure to apply a solid lubricant to the contact surface or to use a carbon-type contact strip which provides the contact surface of the pantograph, in order to reduce friction and wear.

Obviously, other types of contact-type current collectors, such as a current collector which employs a collector shoe or a collector which utilizes a driving wheel as the collector member, can be used equally well. A current collector which relies upon rolling contact between a rolling collector member and a stationary power supply line makes it possible to develop a large contact pressure between these members and, therefore, can suitably be used in supplying large electrical power to the vehicle even when the vehicle is running at a high speed. For instance, it is possible to use one of the rails as the electrical power supply device 10 while using, as the rolling members of the current collector 1, driving wheels which clamp the rail and roll thereon. With this arrangement, it is possible to reduce friction and wear of the contact surface.

Second, third, fourth and fifth examples of the reaction plate 12 used in the high-speed transport system of the present invention are shown in FIGS. 14, 15, 16 and 17, respectively.

Figure 14:
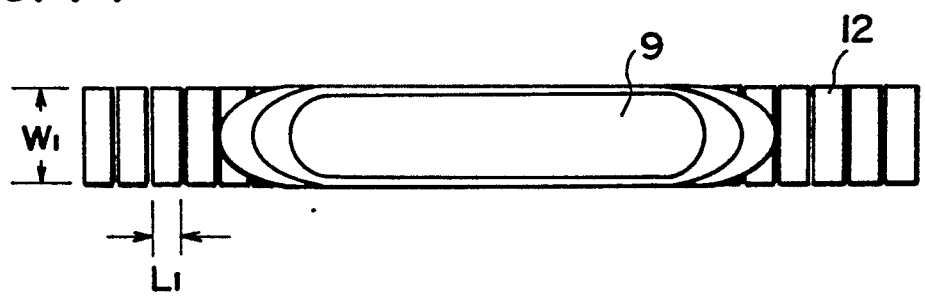
FIG. 14 is an illustration of a second example of a reaction plate used in a high-speed transport system embodying the present invention.

Referring to FIG. 14, the reaction plate 12 has a rectangular form with a length $L_1$ which is equal to the dimension of the driving mechanism 7 as measured in the direction of running of the vehicle and a width $W_1$ which is equal to the width of the vehicle. A plurality of such reaction plates 12 are arrayed over the entire area of the track.

Figure 15:
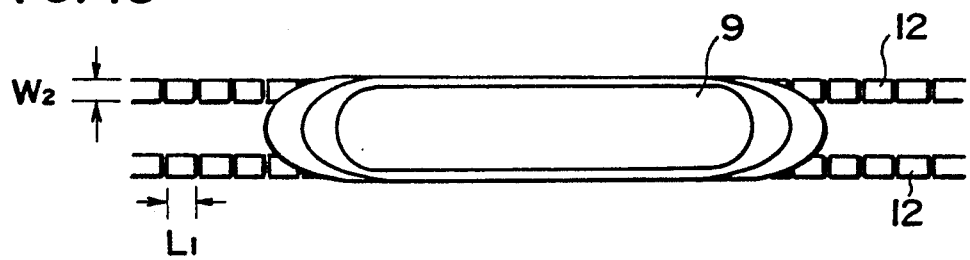
FIG. 15 is an illustration of a third example of a reaction plate used in a high-speed transport system embodying the present invention.

In FIG. 15, the reaction plate 12 has a rectangular form with a length $L_1$ equal to the dimension of the driving mechanism 7 as measured in the direction of running of the vehicle and a width $W_2$ which is the same as the width of the driving mechanism 7. A series of such reaction plates 12 are laid along each side of the track.

Figure 16:
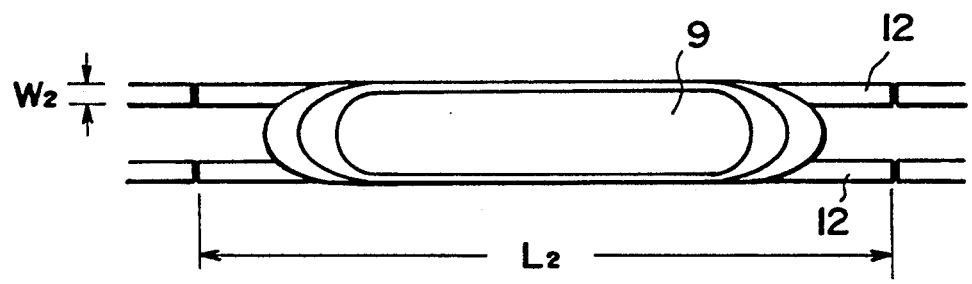
FIG. 16 is an illustration of a fourth example of a reaction plate used in a high-speed transport system embodying the present invention.

In FIG. 16, the reaction plate 12 has a rectangular form with a predetermined length $L_2$ as measured in the direction of running of the vehicle and a width $W_2$ equal to that of the driving mechanism 7. A series of such reaction plates 12 are laid along each side of the track.

Figure 17:
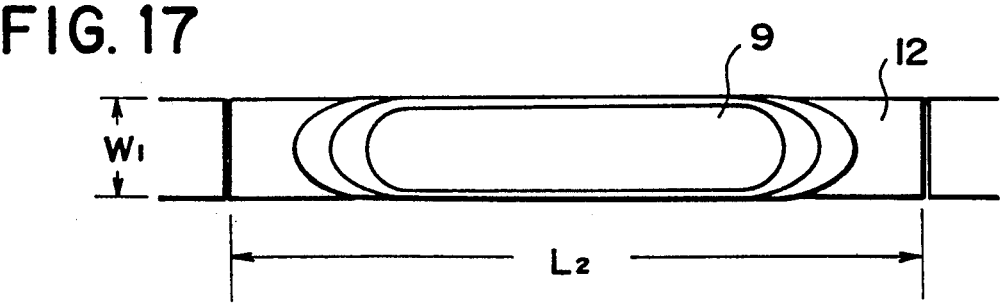
FIG. 17 is an illustration of a fifth example of a reaction plate used in a high-speed transport system embodying the present invention.

Referring now to FIG. 17, the reaction plate 12 has a rectangular form with a predetermined length $L_2$ as measured in the direction of running of the vehicle and a width $W_1$ equal to that of the vehicle. A series of such reaction plates 12 are laid over the entire area of the track.

Figure 18:
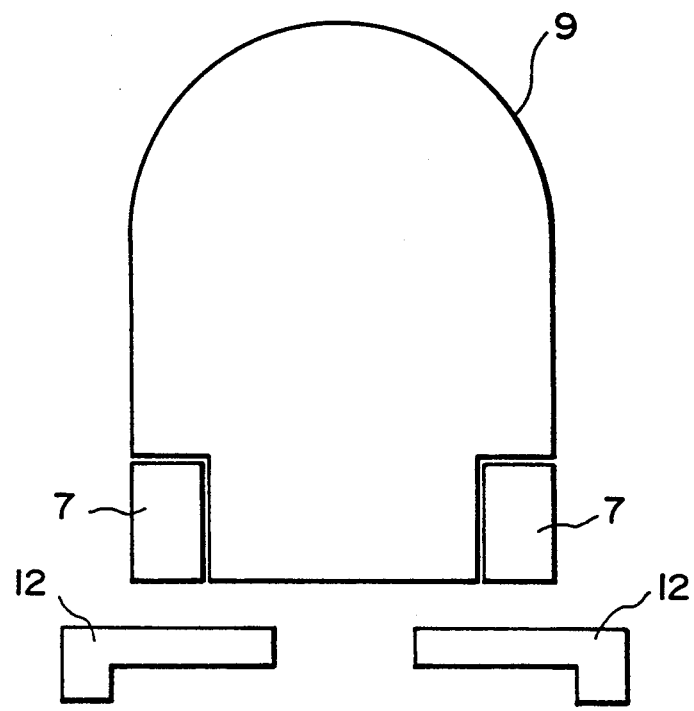
FIG. 18 is an illustration of a concept of a guiding force enhancement means used in a high-speed transport system embodying the present invention.
Figure 19:
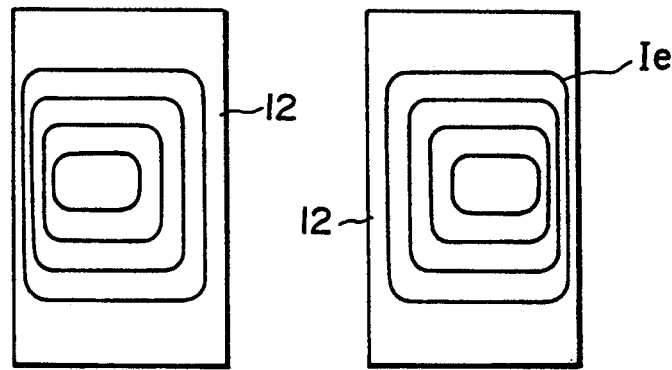
FIG. 19 is a plan view of the guiding force enhancement means of FIG. 18 used in a high-speed transport system embodying the present invention.

FIG. 18 shows the concept of a guiding force enhancement means used in a high-speed transport system embodying the present invention, while FIG. 19 is a plan view of the guiding force enhancement means.

As will be seen from FIG. 18, each reaction plate 12 laid along the track is thickened at its side edge portion. As a consequence, the density of the induction current $I_e$ which is generated when the superconducting magnet 11 (see FIG. 5) of the driving mechanism 7 is rotated is greater at the side edge portion of the track than at other portions. As a consequence, a large guiding force $F_G$ is produced when the driving mechanism 7 tends to be laterally offset from the track. This large guiding force $F_G$ acts on the superconducting magnet 11 so as to force driving mechanism 7 and, hence, the vehicle toward the center of the track. The cross-sectional configuration of the reaction plate 12 shown in FIG. 18 is only illustrative, and any other cross-sectional shape which increases the density of the induction current $I_e$ at the side edge portion of the reaction plate 12 can be used as the guiding force enhancement means.

A description will now be given of a vehicle and a high-speed transport system in which a vehicle can run both along a predetermined track and on an ordinary road surface.

Figure 20:
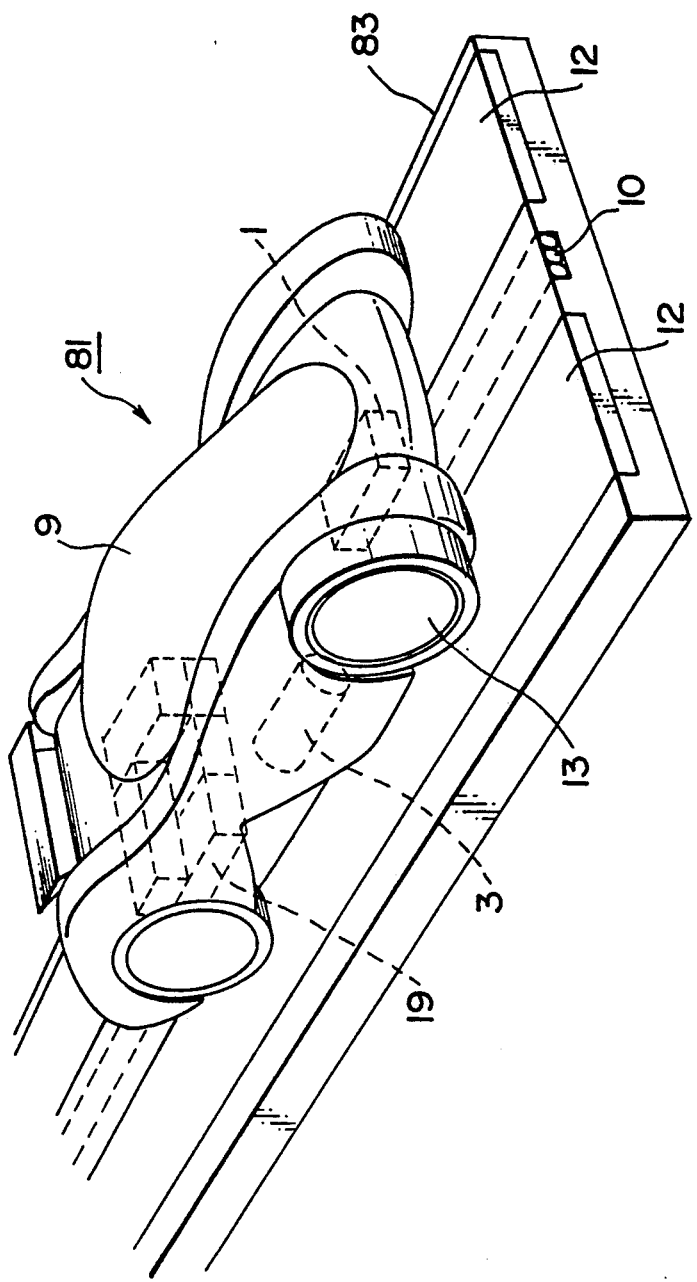
FIG. 20 is a perspective view of a different embodiment of a high-speed transport system embodying the present invention.
Figure 21:
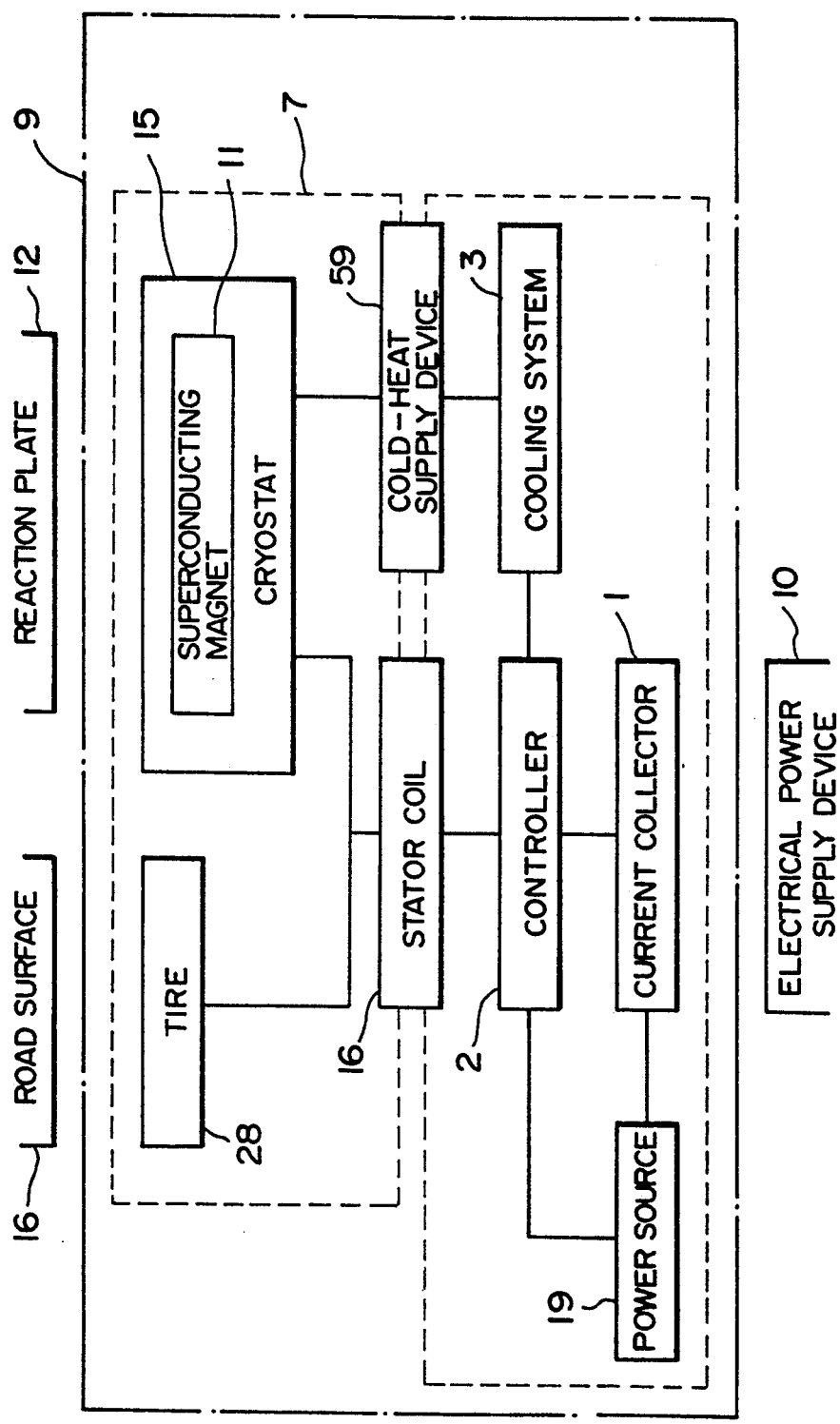
FIG. 21 is a block diagram of the high-speed transport system shown in FIG. 20.

FIG. 20 is a perspective view of another embodiment of a high-speed transport system of the invention, while FIG. 21 is a block diagram of a high-speed transport system shown in FIG. 20.

Referring to these Figures, a vehicle 81 has four driving wheels 13: left and right front driving wheels and left and right rear driving wheels. The driving wheels 13 are supported and rotatingly driven by the respective driving mechanisms 7 so as to produce propulsion force on a track 83 laid along, for example, an expressway or on an ordinary road 16, thereby propelling a vehicle 81.

The vehicle 81, when running on the ordinary road surface 16, is propelled by the propulsion force produced by the friction between the tires 28 of the driving wheels 13 and the surface of the road 16, and can move anywhere, as it is steered through a steering system (not shown). The vehicle also can run at high speed along the track 83. In this case, the vehicle runs in magnetically floated state, without requiring the driving wheels 13 contacting the track 83.

To this end, a pair of rows of reaction plates 12 are laid on the track 83 at positions corresponding to the driving wheels 13 so as to extend along the track 83 and to oppose the driving wheels 13.

When the vehicle starts to run, the driving wheels 13 are rotated on the reaction plates 12 so that induction currents $I_e$ are generated in the reaction plates 12. The induction current $I_e$ induces magnetic flux which acts on the driving wheels 13 to float the vehicle chassis 9 by magnetic action, while generating propulsion force $F_A$ to propel the vehicle along the track 83. At the same time, a guiding force $F_G$ is generated to guide the vehicle along the track 83 during running of the vehicle. All the four driving wheels 13 have an identical construction so that the vehicle 81 is propelled by the sum of the propulsion force $F_A$ produced by four driving wheels 13.

In order to generate forward propulsion force $F_A$, magnetic floating force $F_F$ and the guiding force $F_G$, the vehicle 81 carries a power source 19 for supplying electrical power to the driving wheels 13 and the driving mechanisms 7, as well as a cooling system 3 for maintaining the driving mechanism 7 in superconducting state.

The power source 19 includes a series of batteries and may include an auxiliary power supply device such as fuel cells which assist the batteries. The vehicle also receives external electrical power from an electrical power supply device 10 which is laid, for example, between the left and right rows of the reaction plates 12 on the track 83. To this end, a current collector 1 is mounted on the vehicle chassis 9 so as to oppose the electrical power supply device 10. The current collector 1 may be a contact-type current collector or a non-contact type current collector both of which were described before. The electrical power from the electrical power supply device 10 picked up through the current collector 1 may be directly used for driving the driving wheels 13 or may be supplied to the power source 19 to charge the latter. In order to control the supply of electrical power picked up by the current collector 1, a controller 2 is connected both to the power source 19 and to the current collector 1.

Although the invention has been described through its specific forms, it is to be understood that the described embodiments are only illustrative and various changes and modifications may be imparted thereto without departing from the scope of the present invention which is limited solely by the appended claims.

What we claim is:

1. A magnetically propelled vehicle for running along a way including an electrically conductive, non-magnetic material, said vehicle comprising:
   (a) a rotary magnetic field member mounted on said vehicle at a position near the surface of the way along which said vehicle runs, said rotary magnetic field member being mounted for rotation about an axis perpendicular to said way and having coils of superconducting material with magnetic poles of different polarities arranged to form, around the circumference of said rotary magnetic field member, areas of one polarity alternating with areas of the opposite polarity, each of said areas traversing the axial length of said field member along a line parallel to said axis;
   (b) a shaft rotatably supporting said rotary magnetic field member, said shaft mounted on said vehicle perpendicular to said way;
   (c) driving means for rotatably driving said rotary magnetic field member for rotation about an axis perpendicular to said way to form a varying magnetic field cooperation with said way to suspend and propel the vehicle,
   (d) a cryostat encasing said rotary magnetic field member for maintaining said superconducting material at a cryogenic temperature;
   (e) a refrigerator mounted on said vehicle for cooling a heat exchange fluid medium; and
   (f) fluid medium transfer means within said shaft for supplying cooled fluid medium from said refrigerator to said cryostat.

2. A vehicle according to claim 1, further comprising:
   (g) electrical power collecting means for receiving electrical power from an electrical power supply external to the vehicle; and
   (h) a controller for supplying the electrical power received by said electrical power collecting means to said driving means.

3. A vehicle according to claim 1, further comprising a wheel for supporting said vehicle on said way and wherein said rotary magnetic field member rotates as a unit with said wheel.

4. A high-speed transport system comprising:
   (a) a way including a path of an electrically conductive non-magnetic material;
   (b) a magnetically propelled vehicle which runs along said way, said vehicle comprising:
      (i) a rotary magnetic field member mounted on said vehicle at a position near the surface of the way along which said vehicle runs and which has coils of superconducting material;
      (ii) a shaft rotatably supporting said rotary magnetic field member, said shaft mounted on said vehicle perpendicular to said way;
      (iii) driving means for rotatably driving said rotary magnetic field member for rotation about an axis perpendicular to said way to form a varying magnetic field in cooperation with said way to suspend and propel the vehicle;
      (iv) a cryostat encasing said rotary magnetic field member for maintaining said superconducting material at a cryogenic temperature;
      (v) a refrigerator mounted on said vehicle for cooling a heat exchange medium; and
      (vi) heat exchange medium transfer means within said shaft for supplying cooled heat exchange medium from said refrigerator to said cryostat.

5. A high-speed transport according to claim 4, wherein said vehicle further comprises:
   (vii) electrical power collecting means for receiving electrical power from an electrical power supply external to the vehicle; and
   (viii) a controller for supplying the electrical power received by said electrical power collecting means to said driving means.

6. A high-speed transport system according to claim 5, further comprising a power supply line disposed along said way and wherein said power collecting means includes a non-contact type current collector which picks up electrical power from said power supply line without contacting the power supply line.

7. A high-speed transport system according to claim 6, wherein said power supply line is supplied with a 3-phase A.C. current.

8. A high-speed transport system according to claim 5, wherein said way includes a track coil and wherein said electrical power collecting means includes an on-board coil mounted on said vehicle in close proximity to said track coil.

9. A high-speed transport system according to claim 8, wherein a resonance capacitor is connected to said on-board coil in parallel therewith.

10. A high-speed transport system according to claim 5, further comprising an overhead contact wire extending along said way and wherein said electrical power collecting means includes a contact type current collector which slidingly contacts said overhead contact wire so as to receive electrical power from said overhead contact wire.

11. A high-speed transport system according to claim 4, wherein said way has a plurality of rectangular reaction plates which are arrayed along its length.

12. A high-speed transport system according to claim 4, wherein said way includes a track and a plurality of reaction plates arrayed along the length of the track, each reaction plate being configured such that the density of induction current generated in said reaction plates is greatest at the side edge portions of said reaction plates nearest said track.

13. A high-speed transport system according to claim 4, wherein said way includes a plurality of reaction plates arrayed along its length, each reaction plate having a width equal to the axial length of said rotary magnetic field member.

14. A magnetically propelled vehicle for running along a including an electrically conductive, non-magnetic material, said vehicle comprising:

(a) a rotary magnetic field member mounted on said vehicle at a position near the surface of the way along which said vehicle runs, said rotary magnetic field member being mounted for rotation about an axis perpendicular to said way and having coils of superconducting material with magnetic poles of different polarities arranged to form, around the circumference of said rotary magnetic field member, areas of one polarity alternating with areas of the opposite polarity, each of said areas traversing the axial length of said field member along a line parallel to said axis;

(b) a shaft rotatably supporting said rotary magnetic field member, said shaft mounted on said vehicle perpendicular to said way;

(c) driving means for rotatably driving said rotary magnetic field member, about said axis perpendicular to said way, to form a varying magnetic field in cooperation with said way to suspend and propel the vehicle;

(d) a cryostat encasing said rotary magnetic field member for maintaining said superconducting material at a cryogenic temperature;

(e) a refrigerator mounted on said vehicle for cooling a heat exchange medium;

(f) heat exchange medium transfer means within said shaft for supplying cooled heat exchange medium from said refrigerator to said cryostat;

(g) electrical power collecting means for receiving electrical power from an electrical power supply external to the vehicle; and (h) a controller for supplying the electrical power received by said electrical power collecting means to said driving means and to said refrigerator thereby rotatably driving said rotary magnetic field member in a superconducting state.

15. A vehicle according to claim 14, wherein said driving means includes a stator coil which is supplied with 3-phase A.C. current thereby rotating said rotary magnetic field member.

16. A vehicle according to claim 14, wherein said driving means includes a motor having an output shaft mechanically linked to said rotary magnetic field member to directly drive said rotary magnetic field member.

17. A vehicle according to claim 14, further comprising a wheel for supporting said vehicle on said way and wherein said rotary magnetic field member rotates independently of said wheel.

* * * * *

UNITED STATES PATENT AND TRADEMARK OFFICE
CERTIFICATE OF CORRECTION

PATENT NO. : 5,317,976
DATED : June 7, 1994
INVENTOR(S) : ARUGA et al

It is certified that error appears in the above-indentified patent and that said Letters Patent is hereby corrected as shown below:

Col. 1, line 23, before "the" insert --contaminates--.

Col. 2, line 47, after "the" insert --vehicle of--.

Col. 4, line 1, delete "mechanism" and insert --mechanisms--.

Col. 6, line 67, delete "as" insert --a--.

Col. 7, line 59, after "in" insert --a--.

Col. 8, line 2, delete "into the liquid phase".

Col. 9, line 1, delete "way" insert --may--.

Col. 13, line 14, after "a" insert --way--.

Col. 14, line 19, "superconducting" should read --supercondutive--.

Signed and Sealed this

Twenty-first Day of March, 1995

Attest:

BRUCE LEHMAN

Attesting Officer

Commissioner of Patents and Trademarks